(12) United States Patent
Czajkowski et al.

(10) Patent No.: US 7,624,381 B1
(45) Date of Patent: Nov. 24, 2009

(54) PORTABLE DETECTION OF START AND COMPLETION OF OBJECT CONSTRUCTION

(75) Inventors: Grzegorz Jan Czajkowski, Mountain View, CA (US); Laurent Philippe Daynès, Saint-Ismier (FR)

(73) Assignee: Sun Microsystems, Inc., Santa Clara, CA (US)

( * ) Notice: Subject to any disclaimer, the term of this patent is extended or adjusted under 35 U.S.C. 154(b) by 563 days.

(21) Appl. No.: 10/968,715

(22) Filed: Oct. 19, 2004

(51) Int. Cl.
*G06F 9/44* (2006.01)

(52) U.S. Cl. .............. 717/131; 717/108; 717/116; 717/127; 717/128; 717/130

(58) Field of Classification Search .............. 717/108, 717/116, 120, 121, 128, 129, 130, 131, 132, 717/133
See application file for complete search history.

(56) References Cited

U.S. PATENT DOCUMENTS

| 5,652,888 | A | * | 7/1997 | Burgess | 719/318 |
|---|---|---|---|---|---|
| 5,713,010 | A | * | 1/1998 | Buzbee et al. | 717/124 |
| 5,740,440 | A | * | 4/1998 | West | 717/125 |
| 5,940,616 | A | * | 8/1999 | Wang | 717/127 |
| 6,317,869 | B1 | * | 11/2001 | Adl-Tabatabai et al. | 717/132 |
| 7,096,188 | B1 | * | 8/2006 | Schlick et al. | 705/7 |
| 2006/0015853 | A1 | * | 1/2006 | Babineau et al. | 717/127 |
| 2006/0101407 | A1 | * | 5/2006 | Massarenti et al. | 717/125 |

OTHER PUBLICATIONS

Gschwind, T. et al. "Using run-time data for program comprehension" 11th IEEE International Workshop on Program Comprehension. May 10-11, 2003 p. 245-250.*

* cited by examiner

*Primary Examiner*—Wei Y Zhen
*Assistant Examiner*—Matthew J Brophy
(74) *Attorney, Agent, or Firm*—Osha • Liang LLP

(57) ABSTRACT

A method for tracking a target object, involving identifying at least one portion of code corresponding to a constructor for the target object, and inserting a first tracking method before the at least one portion of code and inserting a second tracking method after the at least one portion of code to obtain executable code, wherein the first tracking method and the second tracking method comprise a calling object reference and a target object reference as arguments.

15 Claims, 4 Drawing Sheets

PORTABLE DETECTION OF START AND COMPLETION OF OBJECT CONSTRUCTION

BACKGROUND

Object-oriented programming languages, such as Java, C++, etc., require the creation and manipulation of objects in order to perform functions dictated by a software program. An object is a unique, concrete instance of an abstract data type (i.e., a conceptual structure including both data and the methods to access the data) whose identity is separate from that of other objects. Objects are used to simulate actions performed by a program written in an object-oriented programming language. Different functions can be simulated and tested by monitoring object behavior or reading the output of objects in a program.

In some cases, specific information from objects may be needed that requires information about the creation and destruction of an object. For example, when analyzing object immutability, knowing when a particular constructor executed to create an object is important. Obtaining object creation and destruction information allows updates to the object's fields to be properly attributed to the constructor and not to post-construction object manipulation.

Typically, objects are tracked by manually editing the code (i.e., source code, executable code, reconstructed machine code, etc.) associated with each object constructor. However, constructors are capable of calling other constructors recursively. Therefore, statically analyzing programs in this manner to detect which constructor invocations should be included and which constructors should be excluded from tracking may be difficult. Another method used to track objects in programming languages involves modifying the run-time platform executing the program.

SUMMARY

In general, in one aspect, the invention relates to a method for tracking a target object, comprising identifying at least one portion of code corresponding to a constructor for the target object, and inserting a first tracking method before the at least one portion of code and inserting a second tracking method after the at least one portion of code to obtain executable code, wherein the first tracking method and the second tracking method comprise a calling object reference and a target object reference as arguments.

In general, in one aspect, the invention relates to a system, comprising an editor configured to identify at least one portion of code corresponding to a constructor for a target object, and insert a first tracking method before the at least one portion of code and insert a second tracking method after the at least one portion of code to obtain executable code, wherein the first tracking method and the second tracking method comprise a calling object reference and a target object reference as arguments.

In general, in one aspect, the invention relates to a computer system for tracking a target object comprising a processor, a memory, a storage device, and software instructions stored in the memory for enabling the computer system under control of the processor, to identify at least one portion of code corresponding to a constructor for the target object, and insert a first tracking method before the at least one portion of code and insert a second tracking method after the at least one portion of code to obtain modified bytecode, wherein the first tracking method and the second tracking method comprises a calling object reference and a target object reference as arguments.

In general, in one aspect, the invention relates to a computer readable medium for tracking a target object comprising software instructions to identify at least one portion of code corresponding to a constructor for the target object, and insert a first tracking method before the at least one portion of code and insert a second tracking method after the at least one portion of code to obtain modified bytecode, wherein the first tracking method and the second tracking method comprises a calling object reference and a target object reference as arguments.

Other aspects of the invention will be apparent from the following description and the appended claims.

DETAILED DESCRIPTION

Figure 1:
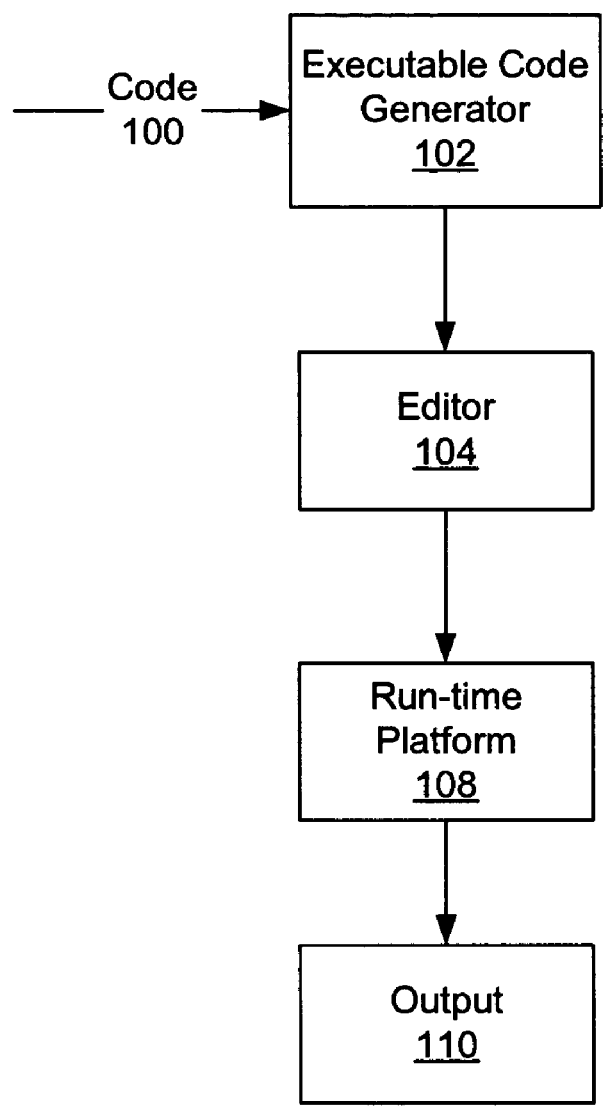
FIG. 1 shows a flow diagram for tracking objects in accordance with an embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to tracking objects during execution of a program. More specifically, embodiments of the invention relate to tracking the creation and completion of objects by modifying code of a program. Further, embodiments of the invention relate to reporting when a constructor is executed.

As noted above, the present invention relates to tracking objects that are created using constructors. In one embodiment of the invention, a constructor defines how an object is created. Specifically, in one embodiment of the invention, constructors may be defined as regular constructors and delegating constructors. A regular constructor is a constructor that does not include recursive calls to other constructors. In contrast, delegating constructors are constructors whose definitions include a recursive call to another constructor. In other words, a delegating constructor includes nested calls to other constructors using the same object reference. In one embodiment of the invention, an example of a constructor is shown in Code Sample 1.

Code Sample 1

```
1 X (int x, int y, int z) { ... }
2 X (int x, int y) {
3   X (x, y, 0);
4 }
  X (int x) {
6   X (x, 0)
7 }
8 X ( ) {
```

9 X (0, 0)
10 }

Code Sample 1 defines both regular and delegating constructors in accordance with one embodiment of the invention. The constructor defined in line 1 is a regular constructor, while the constructors defined in lines 2, 5, and 8 are delegating constructors. For example, the constructor defined in line 5 executes lines 6, which in turn calls the constructor in line 2 above. Subsequently, the constructor in line 2 traverses back to line 1, which then returns a result because the constructor of line 1 does not call another constructor. A delegating constructor works recursively, where the same object reference is used to call another constructor. Therefore, each delegating constructor is traversed similar to the manner in which a recursive program is traversed. Specifically, each call to a delegating constructor is traversed until a result is obtained, and subsequently, the code returns to each previously encountered (i.e., outer) constructor until the process is complete.

FIG. 1 shows a flow diagram for tracking objects in accordance with one embodiment of the invention. As noted above, programmers and developers write programs using programming languages, including object-oriented programming languages. Typically, code (100) is written by a programmer. For example, code (100) may be source code written using C++, assembly Languages, Java™ programming languages, etc. In one embodiment of the invention, code (100) defines methods to create and manipulate objects using constructors, as defined above. Further, in one embodiment of the invention, tracking the creation and completion of objects is defined as tracking the actions that are performed on an object, such as the starting point of creating an object and the deletion of an object.

Continuing with FIG. 1, the code (100), once completed, may be converted into executable code using an executable code generator (102) in accordance with one embodiment of the invention. Executable code is a binary file containing code readable by a run-time platform (108), such as a virtual machine, interpreter, or an operating system. In one embodiment of the invention, executable code may be any intermediate representation of code, such as bytecode (e.g., the bytecode set defined by the specification of the Java™ platform). A run-time platform (108) allows executable code to be executed and accessed on multiple platforms. Subsequently, the executable code may be edited using an editor (104). For example, the editor may be a software program written to automatically identify areas to edit the executable code. Alternatively, a manual process may be used to edit the executable code. Specifically, in one embodiment of the invention, the editor (104) includes functionality to insert tracking methods before and after each constructor within the executable code (including both delegating and regular constructors). In one embodiment of the invention, the code (100) for a constructor, regardless of whether a constructor is a regular constructor or a delegating constructor, is translated into the same executable code. In one embodiment of the invention, in order to track the creation an object, each time a constructor is used to create an object, the executable code associated with the constructor is edited to include tracking methods.

Continuing with FIG. 1, once the executable code is generated, the executable code is executed on a run-time platform (108). In one embodiment of the invention, executable code may be executed on a Java™ Virtual Machine (JVM). Subsequently, the output (110) generated by the tracking methods within the executable code is used to obtain information regarding the creation of an object. For example, output generated by a tracking method may include the target object name, the target object type, timestamps associated with the creation/deletion of the target object, etc.

In one embodiment of the invention, code (100) may be directly edited to include tracking methods. In this case, tracking methods may be inserted into the code (100) prior to generating executable code, and the edited code may be compiled by a compiler to obtain compiled code. Alternatively, the edited code may be compiled by the editor that inserts the tracking methods into the code. Subsequently, the compiled code (including the tracking methods) may be executed on a processor. For example, source code may be edited directly to include tracking methods that include the same functionality described above with respect to editing executable code. In this embodiment, source code may be edited manually or automatically to insert appropriate tracking methods in the appropriate locations. The edited source code may then be compiled by an editor or a separate compiler into machine readable code, which is run on a processor.

In another embodiment of the invention, a reconstruction tool may be written by a developer to reconstruct code from machine code. For example, machine code may be reconstructed into its original source code form. Subsequently, the reconstructed machine code may be edited to insert tracking methods before and after constructors as discussed above. The tracking methods inserted into the reconstructed machine code include the same functionality described above with respect to executable code. The modified reconstructed machine code may then be re-compiled to obtain machine code including tracking methods. Subsequently, the machine code including tracking methods may be executed on a processor. In some cases, using a reconstruction tool may be helpful when access to the source code is not available.

Code Sample 2 shows a pseudo-code example of executable code generated for the constructor shown in Code Sample 1 in accordance with one embodiment of the invention. In one embodiment of the invention, the type of executable code shown in Code Sample 2 is bytecode. However, those skilled in the art will appreciate that the following bytecode is used to illustrate a concrete example of the present invention and is not meant to limit the code tracked in the present invention specifically to bytecode.

Code Sample 2

1 TargetObj=new "X"
2 invoke PrintBegin (TargetObj, calling object)
3 invokespecial (TargetObj, Class Name, "<init X>")
4 invoke PrintEnd (TargetObj, calling object)

In one embodiment of the invention, Code Sample 2 shows the bytecode associated with a constructor in which a new object (TargetObj) is created. Specifically, line 3 of Code Sample 2 shows the invocation of a constructor (i.e., the "invokespecial" method call). In one embodiment of the invention, the target object is the object whose reference is being tracked for information associated with the creation and completion of the object (i.e., TargetObj). Further, the calling object is the object that invokes the "invokespecial" method call of line 3. In other words, the calling object is a reference to the object that calls the constructor of line 3. In one embodiment of the invention, lines 2 and 4 in Code Sample 2 show the tracking methods (i.e., "PrintBegin", "PrintEnd") that are inserted into bytecode to obtain modified bytecode. More specifically, the tracking methods are inserted around the "invokespecial" command because the "invokespecial" command represents the bytecode for a constructor (described below in FIG. 3). Those skilled in the art will appreciate that the bytecode shown in Code Sample 2 may be used for all constructors, including regular constructors and delegating constructors.

Figure 2:
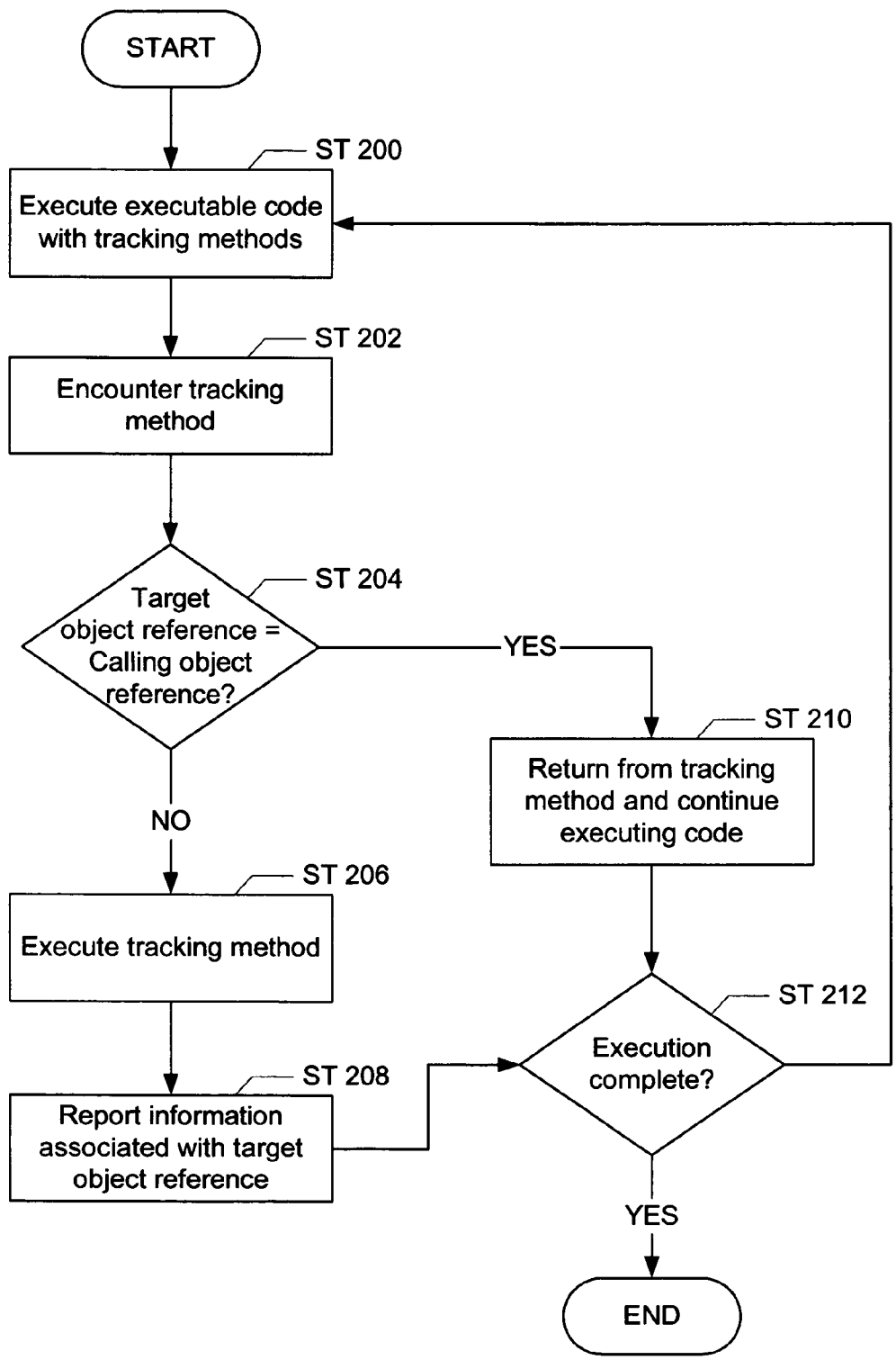
FIG. 2 shows a flow chart for tracking an object in accordance with an embodiment of the invention.

FIG. 2 shows a flow chart for tracking an object in accordance with one embodiment of the invention. Initially, edited executable code (i.e., executable code with tracking methods inserted before and after the constructors) is executed on a run-time platform corresponding to the executable code (Step 200). For example, Java™ bytecode would be executed on a Java™ Virtual Machine (JVM). Alternatively, in one embodiment of the invention, edited source code with tracking methods inserted before and after constructors may be compiled and executed on a processor. In another embodiment of the invention, machine code may be reconstructed with reconstruction tools into its original code form and edited to include tracking methods. The reconstructed machine code may then be compiled and executed on a processor.

Continuing with FIG. 2, a tracking method is encountered in the executable code (Step 202). In one embodiment of the invention, tracking methods may include print statements that report information associated with a target object. For example, print statements may report information by storing the information in a file or area of memory, displaying the information on an output device, etc. Further, in one embodiment of the invention, two arguments are passed to the tracking methods. Specifically, the first argument is the target object reference, which represents the constructed object being tracked by the tracking method. The second argument is the object that called the construction of the target object. More specifically, in one embodiment of the invention, the calling object is the object reference associated with the method that invokes the creation of the target object using a constructor. For example, the calling object may be associated with the method that calls the "invokespecial" command.

At this point, the arguments of the tracking method (i.e., the target object reference and the calling object reference) are compared to determine whether the target object reference is the same as the calling object reference (Step 204). In one embodiment of the invention, the run-time platform executes executable code in a manner that allows the program to ask for the calling object reference. Those skilled in the art will appreciate that a processor may execute compiled code in a similar manner to allow the program to ask for the calling object reference. Further, the target object reference is a reference to the object being tracked. Further, the object reference in not limited to a particular type of argument, but corresponds to anything that identifies the object. In one embodiment of the invention, the target object reference is the object reference on top of the current method's stack. If the target object reference does not match the calling object reference, then the tracking method executes (Step 206), reports information associated with the target object reference (Step 208) and continues execution. This correctly detects regular constructors, because the calling object is different from the constructed object. For example, information associated with the target object reference may include the time the object was created, the object name, the object type, etc. In one embodiment of the invention, the target object reference and the calling object reference are compared using a '==' Boolean operator.

Alternatively, if the target object reference and the calling object reference are equal to each other, indicating that the current constructor is a delegating constructor (i.e., a nested call to construct the same object), the tracking method returns without printing and execution of the delegating constructor continues (Step 210). In this case, the tracking method does not execute and nothing is reported regarding the target object reference. Subsequently, Steps 200-208 are repeated for each constructor encountered in the executable code, until execution of the program on the run-time platform is completed (Step 212). In essence, in one embodiment of the invention, the aforementioned object reference comparison allows only the first instance of tracking methods associated with the creation of a new object to be reported, and any subsequent nested calls to delegating constructors using the same object reference are not reported.

Figure 3:
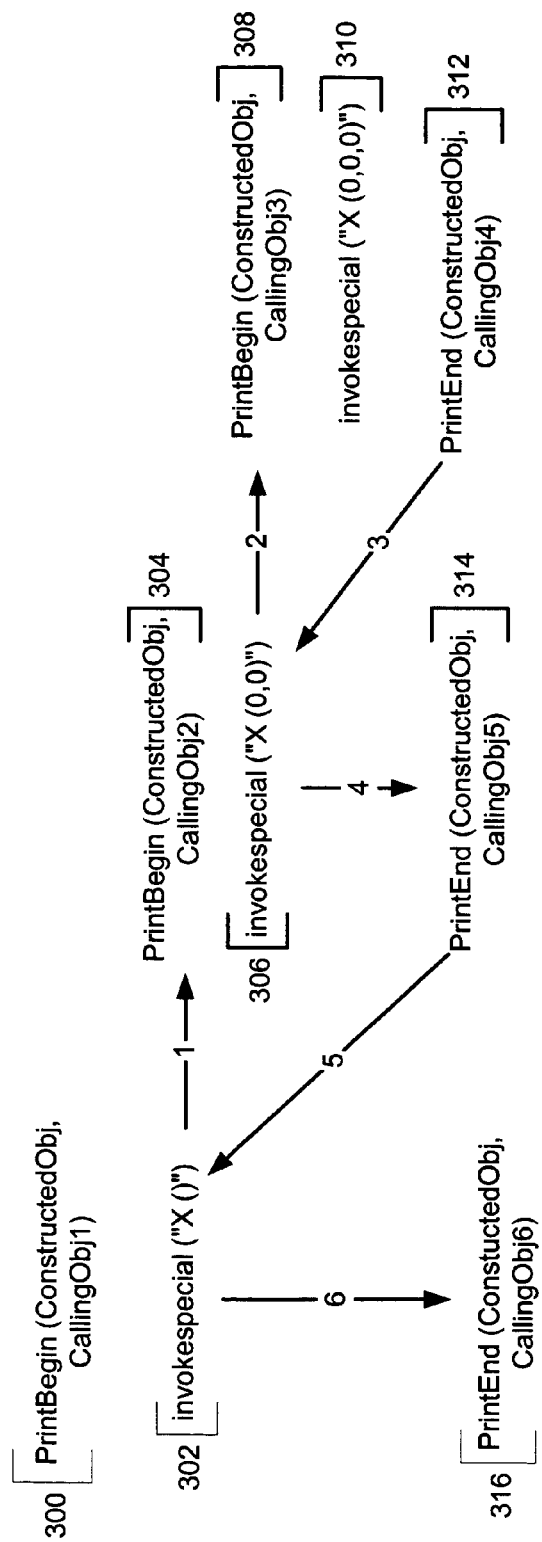
FIG. 3 shows an example of tracking an object in accordance with an embodiment of the invention.

FIG. 3 shows a flow diagram illustrating an example of tracking an object in accordance with one embodiment of the invention. In FIG. 3, the type of executable code shown is bytecode. However, those skilled in the art will appreciate that bytecode is used to show an example of embodiments of the invention and is not meant to limit the code tracked in the invention specifically to bytecode.

FIG. 3 shows tracking methods inserted before and after each "invokespecial" method call for the constructor shown in Code Sample 1 (reproduced below for reference). In one embodiment of the invention, constructor methods are represented as "invokespecial" statement in bytecode. Consider the case in which a new object "ConstructedObj( )" of type X is initially created in the bytecode stream. In one embodiment of the invention, the new object reference associated with the creation of ConstructedObj (i.e., ConstructedObj reference) is pushed onto the current method's stack. Further, consider the scenario in which the first "invokespecial" bytecode corresponds to the constructor of Line 8 of Code Sample 1. Specifically, before the process shown in FIG. 3 begins, Code Sample 1 was given to the bytecode generator, which subsequently, produced a bytecode stream. In particular, the constructor on Line 8 below is represented as an "invokespecial" method.

Code Sample 1

```
1 X (int x, int y, int z) { . . . }
2 X (int x, int y) {
3 X (x, y, 0);
4 }
X (int x) {
6 X (x, 0)
7 }
8 X ( ) {
9 X (0, 0)
}
```

Referring to FIG. 3, initially, when the first tracking method (i.e., PrintBegin (ConstructedObj, CallObj1) (300)) is encountered, an object reference comparison is performed to determine whether the "PrintBegin" method is executed. In one embodiment of the invention, an outer method (i.e., a method associated with the calling object reference CallingObj1 (not shown)) exists that calls the tracking method "PrintBegin." Therefore, at this stage in the example, the calling object reference corresponds to the object reference associated with CallingObj1 and the target object reference is ConstructedObj reference. Thus, when the object reference comparison is performed, the calling object reference (CallingObj1) does not equal the target object reference (i.e., ConstructedObj reference), and the "PrintBegin" method is executed. Specifically, information regarding the creation of ConstructedObj is reported.

Subsequently, the "invokespecial" method is executed (302). As noted above, the "invokespecial" method passes Line 8 of the delegating constructor shown in Code Sample 1 as a parameter. At this point, the tracking method (i.e., PrintBegin (ConstructedObj, CallingObj2) (304)) associated with the bytecode of the constructor in line 8 is encountered (Step 1). Now, when the object reference comparison is performed, the calling object reference is ConstructedObj reference because the execution of the previous "invokespecial" method (302) entered the method associated with ConstructedObj. Further, in one embodiment of the invention, the subsequent call to the "invokespecial" method (306) does not modify the object reference on top of the current method's stack. In other words, the "invokespecial method (306) is a nested call to construct the same object (i.e., ConstructedObj). Additionally, the target object reference is still ConstructedObj reference. Because the object reference is not modified with a delegating call to another constructor, the tracking method determines that both its arguments (i.e., the calling object and the constructed object) are the same and consequently does not execute or report any information. Those skilled in the art will appreciate that the target object reference does not change during this process because the object that is being tracked remains the same through the execution of the constructor.

Continuing with FIG. 3, subsequently the bytecode stream corresponding to line 9 of Code Sample 1 is executed, which calls the bytecode stream corresponding to the constructor in Line 2 of Code Sample 1. Next, the process demonstrated in Step 1 of FIG. 3 is repeated. Specifically, the execution of the bytecode stream corresponding to the constructor of Line 2 encounters another set of tracking methods (i.e., PrintBegin (ConstructedObj, CallingObj3) (308)) (Step 2). Again, the calling object reference and the target object reference are the same and no modification of the object on top of the stack is performed. Thus, the tracking method returns without executing. When the last "invokespecial" shown in FIG. 3 is executed (i.e., invokespecial ("X (0,0,0)") (310)), the bytecode stream corresponding to the constructor of line 1 in Code Sample 1 is called. Because the constructor of line 1 does not call a subsequent delegating constructor, the bytecode corresponding to line 1 executes, a result is obtained, and the second tracking method (i.e., PrintEnd (ConstructedObj, CallingObj4) (312)) is encountered. The object reference comparison performed is the same as before, where the target object reference and calling object reference are both ConstructedObj reference. Therefore, the "PrintEnd" method returns without execution.

Next, execution returns to the previous "invokespecial" (306) which returns a result (i.e., the bytecode completes execution) (Step 3). Subsequently, the tracking method following the "invokespecial" (i.e., PrintEnd (ConstructedObj, CallingObj5) (314)) is called (Step 4), and returns without execution because the object reference comparison is still the same. The execution of bytecode continues, with the first "invokespecial" method (302) completing execution (Step 5), returning a result, and calling the associated tracking method (i.e., PrintEnd (ConstructedObj, CallingObj6) (316)) (Step 6). However, when the original "invokespecial" method (302) returns a result, the calling object reference returns to the original method that called the construction of ConstructedObj (i.e., CallingObj1). This is because CallingObj1 originally called the "invokespecial" method (302) associated with Step 5 of FIG. 3. Thus, the "PrintEnd" method (316) of Step 6 is executed, because the calling object reference differs from the target object reference.

As a result of the process shown in FIG. 3, information associated with the creation and completion of a new object is reported the first time a constructor associated with the new object is encountered, and subsequent delegating calls to other constructors are not reported.

Figure 4:
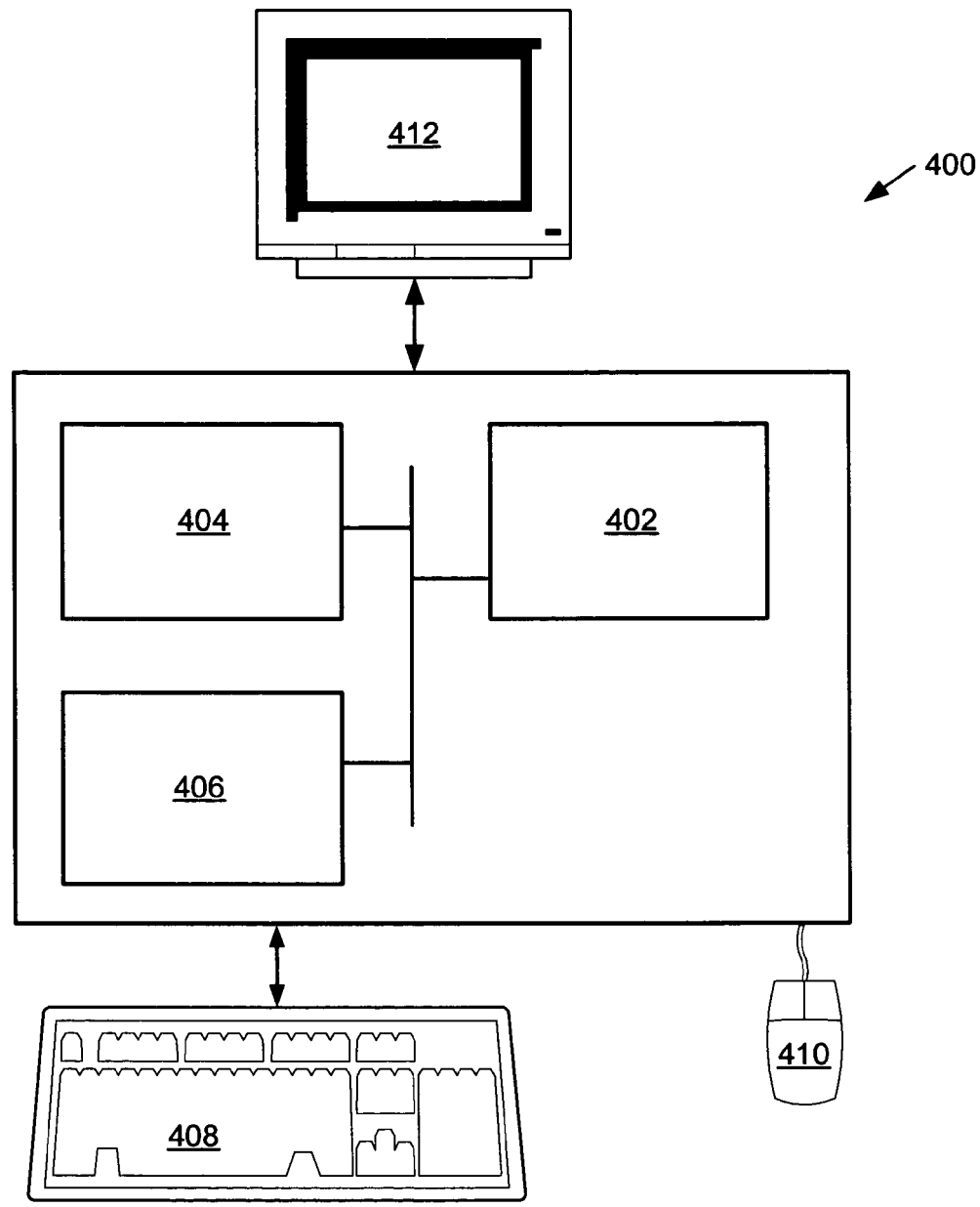
FIG. 4 shows a computer system in accordance with an embodiment of the invention.

One or more embodiments of the invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network via a network interface connection (not shown). Those skilled in the art will appreciate that these input and output means may take other forms. Further, those skilled in the art will appreciate that one or more elements of the aforementioned computer (400) may be located at a remote location and connected to the other elements over a network. Further, software instructions to perform embodiments of the invention may be stored on a computer readable medium such as a compact disc (CD), a diskette, a tape, a file, or any other computer readable storage device.

Embodiments of the invention allow a portable method to track objects. One or more embodiments of the invention provide a method to track constructors of objects where the output of delegating constructors within a particular constructor is not reported. Thus, unnecessary information associated with recursive calls to delegating constructors is not reported.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracking a target object, comprising:
identifying a portion of code comprising a first constructor for the target object after compiling the portion of code and before executing the portion of code;
inserting a first tracking method into the portion of code after compiling the portion of code and before executing the portion of code, wherein the first tracking method compares the target object and an object calling the first constructor to generate a first comparison result;
identifying a second constructor for the target object in the portion of code after compiling the portion of code and before executing the portion of code;
inserting a second tracking method into the portion of code after compiling the portion of code and before executing the portion of code, wherein the second tracking method compares the target object and an object calling the second constructor to generate a second comparison result; and
executing the portion of code including the first tracking method and the second tracking method to generate an output identifying a creation of the target object, wherein generation of the output is based on the first comparison result and the second comparison result, and wherein the output comprises at least one selected from the group consisting of a target object name, a target object type, a target object creation timestamp, and a target object deletion timestamp.

2. The method of claim 1, wherein the output is directed to at least one selected from the group consisting of a display, a file, and an output device.

3. The method of claim 1, wherein the portion of code is bytecode.

4. The method of claim 1, wherein the portion of code is reconstructed using machine code.

5. A computer system for tracking a target object comprising:
- a processor;
- a memory;
- a storage device; and
- software instructions stored in the memory and configured to enable the computer system under control of the processor, to:
    - identify a portion of code comprising a first constructor for the target object after compiling the portion of code and before executing the portion of code;
    - insert a first tracking method into the portion of code after compiling the portion of code and before executing the portion of code, wherein the first tracking method compares the target object and an object calling the first constructor to generate a first comparison result;
    - identify a second constructor for the target object in the portion of code after compiling the portion of code and before executing the portion of code;
    - insert a second tracking method into the portion of code after compiling the portion of code and before executing the portion of code, wherein the second tracking method compares the target object and an object calling the second constructor to generate a second comparison result; and
    - execute the portion of code including the first tracking method and the second tracking method to generate an output identifying a creation of the target object, wherein generation of the output is based on the first comparison result and the second comparison result, and wherein the output comprises at least one selected from the group consisting of a target object name, a target object type, a target object creation timestamp, and a target object deletion timestamp.

6. A computer readable medium storing instructions for tracking a target object, the instructions comprising functionality to:
- identify a portion of code comprising a first constructor for the target object after compiling the portion of code and before executing the portion of code;
- insert a first tracking method into the portion of code after compiling the portion of code and before executing the portion of code, wherein the first tracking method compares the target object and an object calling the first constructor to generate a first comparison result;
- identify a second constructor for the target object in the potion of code after compiling the portion of code and before executing the portion of code;
- insert a second tracking method into the portion of code after compiling the portion of code and before executing the portion of code, wherein the second tracking method compares the target object and an object calling the second constructor to generate a second comparison result; and
- execute the portion of code including the first tracking method and the second tracking method to generate an output identifying a creation of the target object, wherein generation of the output is based on the first comparison result and the second comparison result, and wherein the output comprises at least one selected from the group consisting of a target object name, a target object type, a target object creation timestamp, and a target object deletion timestamp.

7. The method of claim 1, wherein the first constructor calls the second constructor.

8. The method of claim 1, wherein the output is generated by the second tracking method because the second comparison result indicates the target object does not equal the object calling the second constructor.

9. The method of claim 7, wherein the output is generated by the first tracking method because the second comparison result indicates the target object equals the object calling the second constructor.

10. The computer system of claim 5, wherein the first constructor calls the second constructor.

11. The computer system of claim 5, wherein the output is generated by the second tracking method because the second comparison result indicates the target object does not equal the object calling the second constructor.

12. The computer system of claim 10, wherein the output is generated by the first tracking method because the second comparison result indicates the target object equals the object calling the second constructor.

13. The computer readable medium of claim 6, wherein the first constructor calls the second constructor.

14. The computer readable medium of claim 6, wherein the output is generated by the second tracking method because the second comparison result indicates the target object does not equal the object calling the second constructor.

15. The computer readable medium of claim 13, wherein the output is generated by the first tracking method because the second comparison result indicates the target object equals the object calling the second constructor.

* * * * *

UNITED STATES PATENT AND TRADEMARK OFFICE
CERTIFICATE OF CORRECTION

PATENT NO.         : 7,624,381 B1
APPLICATION NO.    : 10/968715
DATED              : November 24, 2009
INVENTOR(S)        : Grzegorz Jan Czajkowski et al.

Page 1 of 1

It is certified that error appears in the above-identified patent and that said Letters Patent is hereby corrected as shown below:

In Claim 6, Column 10 (line 2), please replace "potion" with --portion--.

Signed and Sealed this

Ninth Day of March, 2010

David J. Kappos
*Director of the United States Patent and Trademark Office*